United States Patent Office 2,824,803
Patented Feb. 25, 1958

2,824,803

PRODUCTION OF HOP EXTRACT AND BEER

Fortney H. Stark, Milwaukee, Wis.

No Drawing. Application February 23, 1954
Serial No. 412,113

18 Claims. (Cl. 99—50.5)

The present invention relates to the production of beer and relates particularly to the step of hopping the wort in the process of brewing. The invention also relates to the production of an extractive of hops that is useful in the production of beer.

Commercial beers are ordinarily blends because it has been impossible, in any previously known brewing operation, to produce a given flavor with consistency. Only by blending brews of different flavor has it been possible to approximate the flavor desired.

One of the objectives of the present invention is to provide a means by which beer of improved flavor can be made consistently by following a predetermined formula without blending. This and other greatly desired results are achieved by extracting the desirable components of vine-fresh hops without previous dehydration or even any substantial temperature increase.

For the purposes of this disclosure of the invention, hops which are substantialy unoxidized and contain the natural liquid component of growth are referred to as vine-fresh. This terminology is made necessary by the fact that it is the common practice in the industry to refer to the dehydrated fruit of the hop vine as green or fresh when it has been recently dehydrated and still retains its green color.

In addition to the fact that this invention is primarily concerned with extracts made from vine-fresh hops, it is also concerned with the advantage of using methyl alcohol or methanol as an extractive. Methanol has advantages as an extractive, even as applied to the dehydrated product, particularly when dehydration is conducted at low temperature and the hops remain green or fresh in the sense in which these words have been used in the prior art. However, it is only when the hops are vine-fresh and unoxidized and retain the juices of growth that the invention reaches its maximum significance.

Brewing procedures pursuant to this invention are modified in that a wort-soluble hops concentrate is used, vegetative components of the hops are excluded from the cooker, and much shorter periods of cooking are used. Indications from in-plant brewing according to the present method are that the beer has a very highly desirable reduction in acidity and greatly increased shelf life.

Vine-fresh hops comprise about seventy percent water by weight. Other constituents have heretofore been identified and classified as follows:

(1) Volatile oils, which appear to consist largely of a terpene and a sesquiterpene called humulene.

(2) Resin acids or hop-bitters, which are also known as mumulon or alpha-lupulinic acid $C_{21}H_{30}O_5$, and lupulon or beta-lupulinic acid, $C_{26}H_{38}O_4$. These acids on oxidation appear to be converted to soft resins and finally to hard resins.

(3) Alpha soft resin.
(4) Beta soft resin.

The total quantities of both of the foregoing soft resins is normally at least ten percent of the weight of the hops.

(5) Gamma hard resins (also called alpha and beta hard resins); these amount to about five percent of the hops.

(6) Tannins, particularly a tannin refered to as humulotannic acid.

(7) Pectins.
(8) Chlorophyll.
(9) Carotene.

In addition, there is an antibiotic factor which is present in beer and believed to have its origin in the hops but which I am not able to identify.

The brewing of beer is an old art. In previously known brewing operations, it has been the practice to add hops to the boiling wort in the brew kettle and to boil the resulting beer for one and one-half hours, more or less. During this boiling process, there is a coagulation, referred to as a "break" in the kettle, when the undesirable proteins are precipitated by tannic acid and other substances that are present. This coagulation aids in the subsequent clarification of the beer by filtration or other method.

Hops themselves (also called humulus) are the strobiles of Humulus lupulus, Linné (family Moraceae), bearing its glandular trichomes. The fruit is harvested when the scales have changed from a green to golden color. It is from vine-fresh ripe hops that the extractives of my invention are produced. When I refer to "hops" herein, I refer to the strobiles or cones, unless otherwise indicated. However, while I will ordinarily make my extracts from the fruit only, I can use the whole vine, thus saving the operation of picking off the fruits, because of the fact that my procedure inherently eliminates undesired elements.

The addition of the hops is a step is the production of beer that is difficult and ofttimes incapable of control. Commercial dry hops differ from batch to batch in many characteristics. They differ in their growth or maturity, and also in the manner in which they were harvested and dried, and also in the time elapsed between picking and drying and between drying and use. Some hops, in addition to being kiln-dried, are exposed to the fumes of burning sulphur as a means of preserving them. In such preservation processes, the amounts of sulphur dioxide used are generally not subjected to accurate control, as a consequence of which the hops may retain an undesirable acidic taste and odor. The age of commercial hops and the handling and storing and temperatures to which they have been subjected also affect their value in brewing.

Deterioration of vine-fresh hops is so rapid that it is ordinarily considered necessary to take steps within four to six hours for preservation either by dehydration or by freezing. Frozen storage for any substantial period has not been commercially acceptable because the hops tend to develop musty odors and beer made therefrom has a flavor known to the trade as "grassy." Dehydration is the accepted procedure. While it preserves some of the elements of the hops, other elements are adversely affected, most volatiles being driven off and many of the flavor imparting ingredients being oxidized to a greater or lesser degree. Many of the resin acids and soft resins are converted to relatively unusable hard resins by heating and oxidation.

Freshly dehydrated hops may retain their green color if dehydration has been conducted at a fairly low temperature. However, such dehydrated hops cease to be "fresh" or green within a period of a few weeks or months of storage due to loss or conversion of chlorophyll and carotene and continuing oxidation. Cold storage retards the oxidation, but does not prevent it.

Accordingly, many attempts have been made to prepare extracts of the fresh green hops immediately following dehydration. Ordinarily the dehydrated hops have been ground up and subjected to solvents such as water, ether, ethanol, acetone and others. The resulting extractives have not produced the desired results. Beers in which they are used have had various undesirable flavors including some described as "grassy" or "medicinal" or "bitterness."

In the light of the present invention, it appears that desired and even greatly improved flavors will consistently result if the extract is made from vine-fresh hops which have not been picked longer than a very few hours (desirably four to six hours at the outside, unless refrigerated) and which have not been subjected to boiling or high temperatures or dehydration, and particularly if methanol is used as the extractive solvent. Beer made from an extract of hops produced in accordance with this invention not only has normal nutritive value, but additionally has the taste and flavor of vine-fresh hops, is stable as to flavor, without developing undesirable odors or flavors on standing, is remarkably free of bitterness, and does not induce drowsiness.

Methanol apparently has a selective extractive action, rendering it somewhat superior to other solvents. Thus, although I may use any solvent suitable for dissolving the volatile oils, resin acids and soft resins of hops, all heretofore used for making extracts of dehydrated hops, the use of methanol is preferred.

Specifically, by way of example only, I may use any of the lower aliphatic monohydric alcohols or ethers (such as ethanol, isopropanol, methyl or ethyl ether), or any of the lower aliphatic ketones or esters of acetic acid (such as acetone, ethyl acetate). The less water the solvents contain, the better, although there is no point in requiring that they be completely anhydrous for the reason that the vine-fresh hops themselves contain water, the presence of which may dilute any of these solvents. The reason it is desirable that the water be minimized is to preclude any substantial dissolving of the pectins and to reduce the dissolving of tannins beyonds the limited extent which may be needed for coagulation of the wort.

Whether or not the solvent used is methanol, all traces of the solvent may be expelled from the product during processing, as hereinafter described. The extractive, when used in the brewing of beer, reduces the cooking time from approximately one and one-half hours to approximately twenty minutes or less, increases the proportion in the beer of desirable soft resins, increases the proportion in the beer of the volatile constituents, retains chlorophyll and carotene otherwise wholly lost, and decreases the proportion in the beer of gamma resins, tannins and pectins. The amount of tannin present is, however, entirely adequate to produce the desirable break and coagulation during cooking. The resulting beer is remarkably free of after taste or odors such as are produced in ordinary beer when the beer is allowed to stand, or which appear in the mouth after drinking.

The preferred procedure is as follows:

I start with vine-fresh hops, which are picked when ready for harvesting. Within a very few hours after picking (desirably four to six hours at the outside, although the period can be prolonged by cooling), the freshly picked vine-fresh hops are subjected to extraction by immersion or steeping in the selected solvent or by flowing the solvent one or more times over the hops. Desirably the hops are not dehydrated at all as a preliminary to this treatment but it will be understood that the damage done by dehydration is at least largely attributable to heat and is a progressive damage. Therefore, a relatively small amount of dehydration will do relatively little damage, particularly if little heat is involved. In the preferred practice I not only avoid any dehydration (which is wholly unnecessary) but conduct the extraction operation at temperatures no higher than prevailing ambient room or outdoor temperatures, the cooler the better.

As stated above, I may use any one of a wide range of extracting solvents but I prefer to use methanol. The methanol may be anhydrous but ordinary commercial methanol is satisfactory. Normally the methanol is flowed over the vine-fresh hops at least three times. Usually this is sufficient to remove most of the desired constituents.

The extract is then concentrated to any desired degree by evaporation or distillation to expel the solvent. If the solvent is toxic, it may all be expelled to leave only the resinous or gummy extractives. The evaporation is desirably conducted with a minimum of heat and I may use vacuum type evaporation in order to operate at or below ambient room or outdoor temperature. In practice I find that with all methanol eliminated, the concentrate has a solid gelatinous form and is wort-soluble. If ethanol is used as the extracting solvent, it is not necessary that all of the solvent be removed and the wort-soluble concentrate may remain a liquid.

The water picked up by the alcohol or other solvent passes over during the evaporation or distillation in the form of azeotropes in mixture with the solvent vapor. If it is desired to ensure the complete expulsion of the solvent from the extractives, I may complete the evaporation or distillation by washing the extractives with a small amount of water or with water vapor until the discharging vapor shows no trace of solvent. While a substantial proportion of the volatile essential oils is removed from the extractives in the distillation or evaporative process, the major portion of the higher boiling point essential oils is retained and even the more volatile components tend to be picked up by the soft resins and retained so that they pass to the final brew in sufficient quantities to impart a distinctive and very desirable flavor, never before achieved. In ordinary preparation of hops by dehydration, these desirable and highly volatile components are lost with the water vapor and do not reach the brew at all.

Extractives thus prepared are relatively stable and can be kept without refrigeration or other precautions over substantial periods, desirably in sealed containers.

In using the extractives of my invention in the production of beer, there are desirably substantial changes in normal brewing procedures.

In the first place, all vegetative components of the hops are excluded from the cooker, along with the sulphur and other foreign matter which has heretofore been introduced into the beer, along with such components.

In the second place, inasmuch as the concentrates of the present invention are wort-soluble, the cooking time required after the addition of the extractives is greatly reduced and may be nearly eliminated. In practice I have used twenty minutes or less of cooking instead of the one and one-half hours normally required when dehydrated hops have been used. By reducing the cooking time, I reduce the extent to which volatiles are driven off. A much more desirable flavor results.

In the third place, certainty of result is achieved, as compared with the variability of flavor which has been inevitable in previous brewing practice.

The break normally observed when dried hops are cooked is also observed when my extractives are used. The beer is subsequently subjected to clarification and adjustment for foam, carbonation, color, and the like, and pasteurized. No change in the preliminary preparation of the wort or other fermentation procedures is necessary or contemplated in the production of beer from the extractives of this invention. The resulting beer withstands pasteurization treatments without flavor change.

Dependent upon the characteristics of the particular extractives that are produced, the proportion of them used to produce beer of desirable flavor and taste may be varied as desired. In practice I have used from one to two grams (dry weight) of concentrate per gallon of wort. However, while this is an appropriate range, I do not wish to limit myself thereto. The differences in tastes of beers made within this range are rather easily noted. I find that a variation of only one-half gram per gallon produces consistently a sufficient difference in flavor to be perceptible to anyone.

The quantity of extractives which are obtained from any particular lot of vine-fresh hops will vary somewhat as do crops of all plants, but normally the constitution of the extractives obtained from vine-fresh hops will be relatively constant as contrasted with the variable amounts of dehydrated hops now required.

As indicated above, the use of methanol has value even apart from my preferred practice of starting with vine-fresh hops. While methanol extractives of dried hops are useful for brewing in a degree which is maximum at the time of the drying and decreases with the length of storage, the ultimate objectives of the invention can not be achieved with anything short of vine-fresh hops as a starting product. However, the selective solvent action of methanol gives hop extracts, even from dehydrated hops, which are superior to any previously known hop extract.

It is desired to note that in the past the preparation of the hops has been the only element of the brewing operation which has not been subject to control. Dehydration has been the only known way of keeping hops over the long intervals between crops. Yet the introduction of the whole hops, from which only water has been removed, has not only been unsanitary but has required prolonged cooking of the wort for the purpose of re-softening the resinous compounds which have become hard in storage. The brewer has had no means of supplying himself with hop components of given quality or content and has been forced to accept hops which have passed through uncertain treatment and periods of storage with and without admixture of sulphur dioxide and other foreign materials.

Through the use of my invention the brewing process has finally become subject to complete control, and I have assured uniformity of result and a very distinctively novel and superior flavor of the resulting beer. The beer produced by the methods herein disclosed is readily distinguishable from beer produced by routine brewing methods. Not only is the flavor distinctive, and readily identifiable by anyone but the total acids, expressed as lactic acid, has been reduced in in-plant brewing operations as much as twenty-five percent. This reduction is regarded as a highly desirable result. Moreover, the I. T. T. oxidation reduction potential test shows that beer made according to my method can be expected to have as much as twenty-five percent increase in shelf life as compared with beer made from exactly the same ingredients and according to exactly the same procedures in all respects except for the substitution of my hops concentrate in place of dehydrated hops, with reduced cooking time as above described.

While the present invention has been specifically described with reference to vine-fresh hops which have preferably not been picked longer than a few hours, it is understood that local conditions, particularly the short time for harvesting hops and/or lack of adequate facilities may require recourse to well known refrigerating or cooling techniques to preserve the vine freshness of the hops. Consequently, the term "vine fresh" in the specification and claims herein is intended to cover hops which have not been picked longer than a few hours, desirably four to six hours at the outside unless such period has been extended by appropriate refrigerating or cooling of the hops.

I claim:

1. A method of providing a hops concentrate in a wort soluble form usable in brewing or the like, which method comprises making an extraction of soft resins and volatile oils by subjecting vine-fresh hops to the action of a solvent in which alpha and beta soft resins and volatile oils are substantially soluble and separating from the vegetative material the extract containing such resins and oils.

2. The method recited in claim 1 in which the extraction is conducted at a temperature not substantially in excess of ambient temperature.

3. The method of claim 1 in which the hops extract is subjected to an evaporative concentration process for the removal of solvent and water.

4. The method recited in claim 1 in which chlorophyll and carotene are also appreciably soluble in the solvent used.

5. The method recited in claim 1 followed by the further step of concentrating the extraction dissolved by the solvent from the vine-fresh hops by evaporating at least a portion of the solvent.

6. The method recited in claim 1 in combination with the further step of concentrating the extraction from the vine-fresh hops by evaporating at least a portion of the solvent at sub-atmospheric pressure.

7. The method recited in claim 1 in which the solvent is selected from a group consisting of the lower aliphatic monohydric alcohols and ethers and the lower aliphatic ketones and esters of acetic acid.

8. The method of claim 7 in which the solvent is methanol.

9. The method of claim 7 in combination with the further step of concentrating the solvent extract of vine-fresh hops.

10. The method of preparing an extract of hops for use in brewing, said method comprising the treatment of vine-fresh hops with an alcoholic solvent until a major part of the soft resins, resinous acids, chlorophyll and carotene are extracted, discarding the residue of the hops, and separating alcoholic solvent from the extract.

11. The method recited in claim 10 in which the separation is accomplished by evaporation conducted at a temperature not substantially higher than the ambient atmospheric temperature.

12. As a new composition of matter, the concentrate of an extraction of vine-fresh hops produced by the method of claim 1, said concentrate being wort soluble and substantially free of pectin and water soluble gamma resins, and comprising chlorophyl, volatile oils and soft alpha and beta resins and acids thereof.

13. A method of brewing which comprises the extraction of volatile oils and soft resins from vine-fresh hops by treating the hops with a solvent in which such oils and resins are soluble, concentrating the extract, preparing a wort and delivering the concentrated extract into the wort in quantities of the general order of one to two grams dry weight per gallon of wort.

14. A method of brewing which comprises the extraction of volatile oils and soft resins from vine-fresh hop fruits and vines by treating the fruits and vines to a solvent in which such oils and resins are soluble, concentrating the extract, preparing a wort, and delivering the concentrated extract into the wort in predetermined quantities in relation to the amount of wort, such quantities being of the general order of one to two grams dry weight per gallon of wort.

15. A process for the production of beer which comprises the steps of making an extraction of soft resins and volatile oils by subjecting vine fresh hops to the action of a solvent in which alpha and beta soft resins and volatile oils are substantially soluble, separating from the vegetative material the extract containing such resins and oils, evaporating the undesired quantities of said solvent, fermenting a wort, adding a small portion of the said extract to the wort, cooking the mixture of extract and wort, and subsequently clarifying and recovering the resulting beer.

16. A product produced by the process of claim 15 and containing in marked degree the volatile oils, carotene, and soft alpha and beta resins of vine fresh hops, said beer being characterized by low acidity and long shelf life.

17. A method of obtaining a hops extract comprising soft resins and volatile oils by flowing a solvent at least one time over vine-fresh hops at ambient temperature, evaporating the desired amount of said solvent by vacuum-type evaporation at essentially said ambient temperature and recovering said hops extract comprising soft resins and volatile oils concentrate having solid gelatinous form that is wort soluble.

18. A method as set forth in claim 17, wherein said solvent is completely removed by washing said hops extract with water during the last stages of evaporation.

References Cited in the file of this patent

UNITED STATES PATENTS

| | | |
|---|---|---|
| 496,752 | Schweissinger | May 2, 1893 |
| 1,319,984 | Wolf | Oct. 28, 1919 |
| 2,181,931 | Wood | Dec. 5, 1939 |
| 2,191,838 | Horst | Feb. 27, 1940 |
| 2,243,143 | Wood | May 27, 1941 |
| 2,562,934 | Michener | Aug. 7, 1951 |

OTHER REFERENCES

Chemical Abstracts, vol. 37, col. 720. (Abstract of Chem. Abstract Journal (Russian) 1940, No. 9, page 109.)

"A Survey of Procedures for Grading the Quality Standards of Hops," by W. B. Thomas, 2 pages. Reprinted from October 1938 issue of Western Brewing World.